United States Patent
Simpson

(10) Patent No.: US 7,419,193 B2
(45) Date of Patent: Sep. 2, 2008

(54) TUBING CONNECTOR

(75) Inventor: Neil Andrew Abercrombie Simpson, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 244 days.

(21) Appl. No.: 10/866,319

(22) Filed: Jun. 11, 2004

(65) Prior Publication Data

US 2005/0001429 A1    Jan. 6, 2005

(30) Foreign Application Priority Data

Jun. 11, 2003    (GB)    ................... 0313472.3

(51) Int. Cl.
*F16L 13/14*    (2006.01)
*E21B 23/00*    (2006.01)

(52) U.S. Cl. ................. 285/382.4; 285/382.2; 166/207; 166/380

(58) Field of Classification Search ................. 166/207, 166/380; 285/382, 382.1, 382.2, 382.4, 382.5
See application file for complete search history.

(56) References Cited

U.S. PATENT DOCUMENTS

| | | | | |
|---|---|---|---|---|
| 1,547,003 A | | 7/1925 | Schwartz | |
| 2,741,498 A | * | 4/1956 | Elliott | 285/148.11 |
| 3,245,471 A | * | 4/1966 | Howard | 166/387 |
| 5,582,439 A | * | 12/1996 | Spears | 285/333 |
| 6,098,717 A | | 8/2000 | Bailey et al. | |
| 6,106,024 A | | 8/2000 | Herman et al. | |
| 6,312,018 B1 | | 11/2001 | Martin | |
| 6,425,444 B1 | | 7/2002 | Metcalfe et al. | |
| 6,722,443 B1 | * | 4/2004 | Metcalfe | 166/384 |
| 6,942,029 B2 | | 9/2005 | Simpson | |
| 2002/0079106 A1 | | 6/2002 | Simpson | |
| 2002/0163192 A1 | | 11/2002 | Coulon et al. | |
| 2003/0067166 A1 | | 4/2003 | Sivley, IV | |
| 2004/0004354 A1 | * | 1/2004 | Spears | 285/390 |
| 2004/0090068 A1 | * | 5/2004 | Evans et al. | 285/382 |
| 2004/0135370 A1 | * | 7/2004 | Evans et al. | 285/333 |
| 2005/0087983 A1 | * | 4/2005 | Verger et al. | 285/333 |

FOREIGN PATENT DOCUMENTS

| | | | |
|---|---|---|---|
| GB | 2345308 A | * | 12/1999 |
| GB | 2395501 | | 5/2004 |
| WO | WO 03/048521 | | 6/2003 |

* cited by examiner

*Primary Examiner*—James M Hewitt
(74) *Attorney, Agent, or Firm*—Patterson & Sheridan, L.L.P.

(57) ABSTRACT

A method of coupling first and second expandable tubulars comprises providing a male tubular connector portion and a female tubular connection portion having greater yield strength, coupling the connector portions together, and expanding the coupled connector portions. The coupled connector portions may be expanded downhole.

19 Claims, 4 Drawing Sheets

TUBING CONNECTOR

CROSS-REFERENCE TO RELATED APPLICATIONS

This application claims benefit of Great Britain patent application serial number GB 0313472.3, filed 11 Jun. 2003, which is herein incorporated by reference.

BACKGROUND OF THE INVENTION

1. Field of the Invention

The present invention relates to a tubing connector. In particular, the invention relates to an expandable tubing connector.

2. Description of the Related Art

In the oil and gas exploration and extraction industry, well bores are lined with metal tubing. Typically, the majority of a well will be lined with tubing known as casing, while the distal end of the well is provided with smaller diameter tubing known as liner. Generally, the section of the well provided with the liner will intersect the hydrocarbon-bearing formation.

Both the casing and the liner will typically be formed of tube sections with threaded or otherwise formed ends, such that the tube sections may be joined end-to-end to form longer tubing strings. The tube section ends may be formed to provide male and female coupling portions, generally known as pin and box couplings, or may be formed as male portions adapted to co-operate with external connectors or sleeves.

In recent years there have been numerous proposals to provide downhole tubing which is expanded downhole, that is casing, liner or other tubing of a first diameter which is run into a bore and then expanded to a larger second diameter. However, difficulties have been experienced in creating tubing connections which will maintain their integrity following expansion. In particular, threaded connections tend to loosen or separate on expansion, and there have been numerous proposals for connections with, for example, different thread forms, with a view to countering this difficulty.

It is among the objectives of embodiments of the invention to provide an expandable tubing connector which will maintain integrity post-expansion.

SUMMARY OF THE INVENTION

According to a first aspect of the present invention there is provided a method of coupling first and second expandable tubulars, the method comprising:

providing a male tubular connector portion having a first yield strength;

providing a female tubular connection portion having a second yield strength greater than said first yield strength;

coupling the connector portions together; and expanding the coupled connector portions.

According to a second aspect of the present invention there is provided a method of coupling first and second expandable tubulars, the method comprising:

providing a female tubular connector portion having a second modulus of elasticity lower than said first modulus of elasticity;

coupling the connector portions together; and expanding the coupled connector portions.

The invention also relates to an expandable connector.

In both aspects of the present invention, selection of the material properties of the connector portions facilitates maintenance or even enhancement of a secure coupling between the male and female connector portions following expansion; the elastic recovery of the outer female connection portion will be greater than the elastic recovery of the inner male connector portion.

These aspects of the invention have particular utility in downhole applications where tubulars, such as liner or casing sections, may be coupled to form tubing strings. In such applications it is of course preferred that the coupling between the connector portions retains both mechanical and pressure integrity post expansion.

One or both of the connector portions may be mounted to an end of a tubing section to, for example, form pin and box connectors. In other embodiments, one of the connector portions may be in the form of an inner or outer sleeve adapted to co-operate with one or two other female or male connector portions.

Preferably, the connector portions are threaded. Alternatively, or in addition, other coupling arrangements may be provided, including but not limited to co-operating tapers, snap rings or other coupling members, pins, screws, welding, keys or dogs.

The material properties, that is the yield strength or elastic or Young's modulus, of a tubular connector portion may be substantially constant across the thickness or length of the portion wall. Alternatively, the material properties may vary across the thickness of the wall. This may be achieved by a number of means, for example selective localised heat treatment of a portion of the wall. In other examples, the wall may comprise two or more different materials, for example the wall may incorporate one or more bands of different materials having different properties. The different materials may be integral or may be present as separate members. In one embodiment a ring or sleeve of relatively high yield strength or low modulus material, such as titanium alloy, may be provided externally of an otherwise conventional female tubular connector portion. The ring or sleeve may be located by any suitable means, including shrink filling or an interference fit. Thus embodiments of the invention may be provided utilising substantially conventional connector portions, which may even be of the same material, by providing a close-fitting ring or band of a material such as titanium alloy around the female portion. In another embodiment, a high yield strength or low modulus insert may be incorporated, externally or internally, in the female connector portion.

The coupled connector portions may be expanded by any appropriate method, including forcing an expansion swage, cone or mandrel through the coupling, or applying an elevated hydraulic pressure to the inner diameter of the male portion, or a combination of both. The swage or cone may take any appropriate form, and may include rolling or low friction surfaces to facilitate translation of the expansion device through the coupling. Such expansion induces circumferential stretching or strain in the tubulars. For such mechanisms, it is important that the female portion is free to expand.

Alternatively, or in addition, it may be possible to expand the coupling utilising a rolling or rotary expansion device, which may or may not be compliant, such as the various expansion devices which are available from the applicants, and as described in WO00\37766 and U.S. Pat. No. 6,457,532, the disclosures of which are incorporated herein by reference.

Spacing, sealing or gripping members may be provided on one or both of the connection portions, or for location between the portions. The sealing members may include elastomeric rings or sleeves, or rings or bands of formable material, such as relatively soft metal such as lead or bronze.

For the first aspect, the materials utilised to form the couplings may have the same or similar elastic moduli.

Of course the aspects of the invention may be combined, that is by providing a female tubular connector portion with a greater yield strength and a lower modulus of elasticity.

BRIEF DESCRIPTION OF THE DRAWINGS

These and other aspects of the present invention will now be described, by way of example, with reference to the accompanying drawings, in which.

DETAILED DESCRIPTION OF THE DRAWINGS

Figure 1:
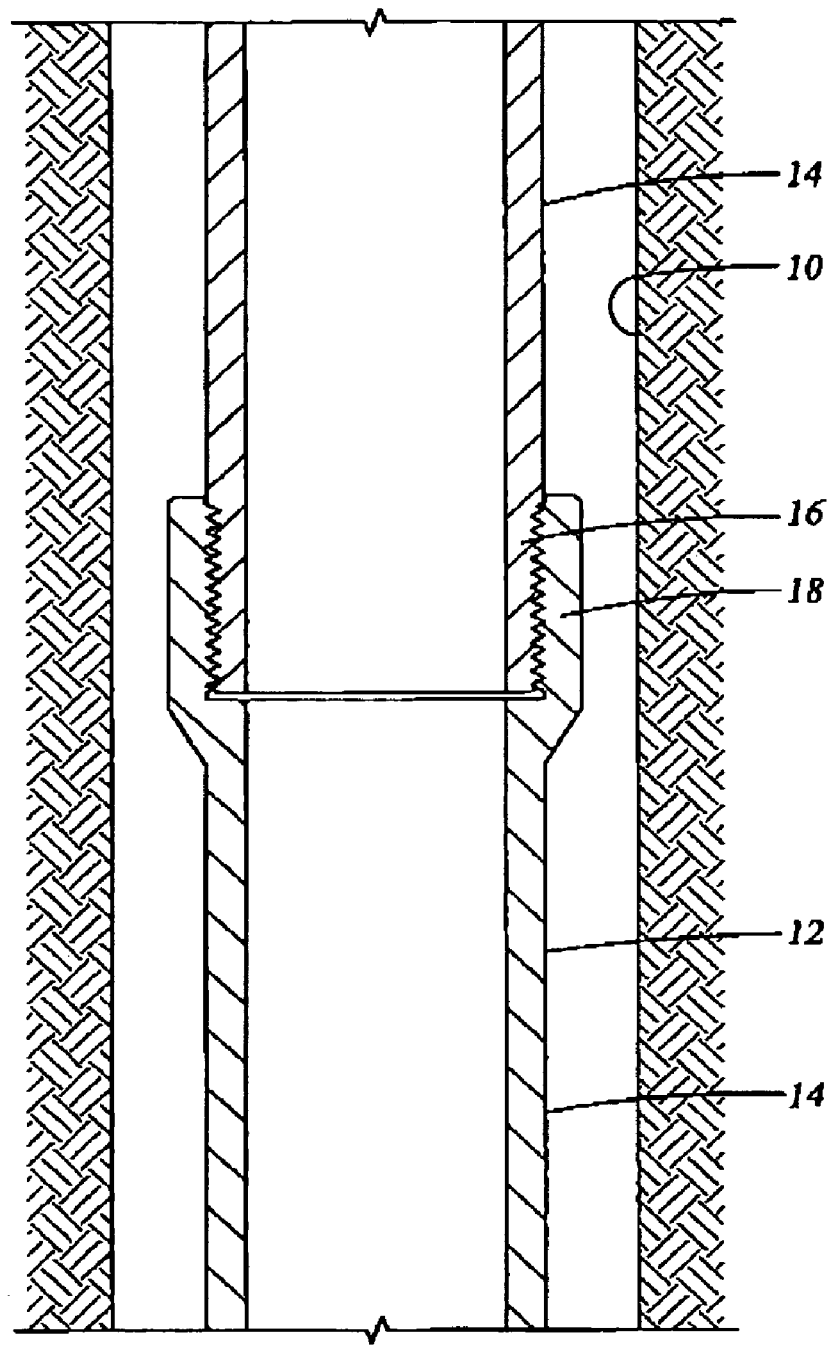
FIGS. 1 and 2 are schematic sectional views of steps in expanding a tubing connector in accordance with an embodiment of the present invention.

Reference is first made to FIG. 1 of the drawings, which illustrates a section of a drilled bore 10 into which a tubular, in the form of a casing string 12, has been run.

Figure 2:
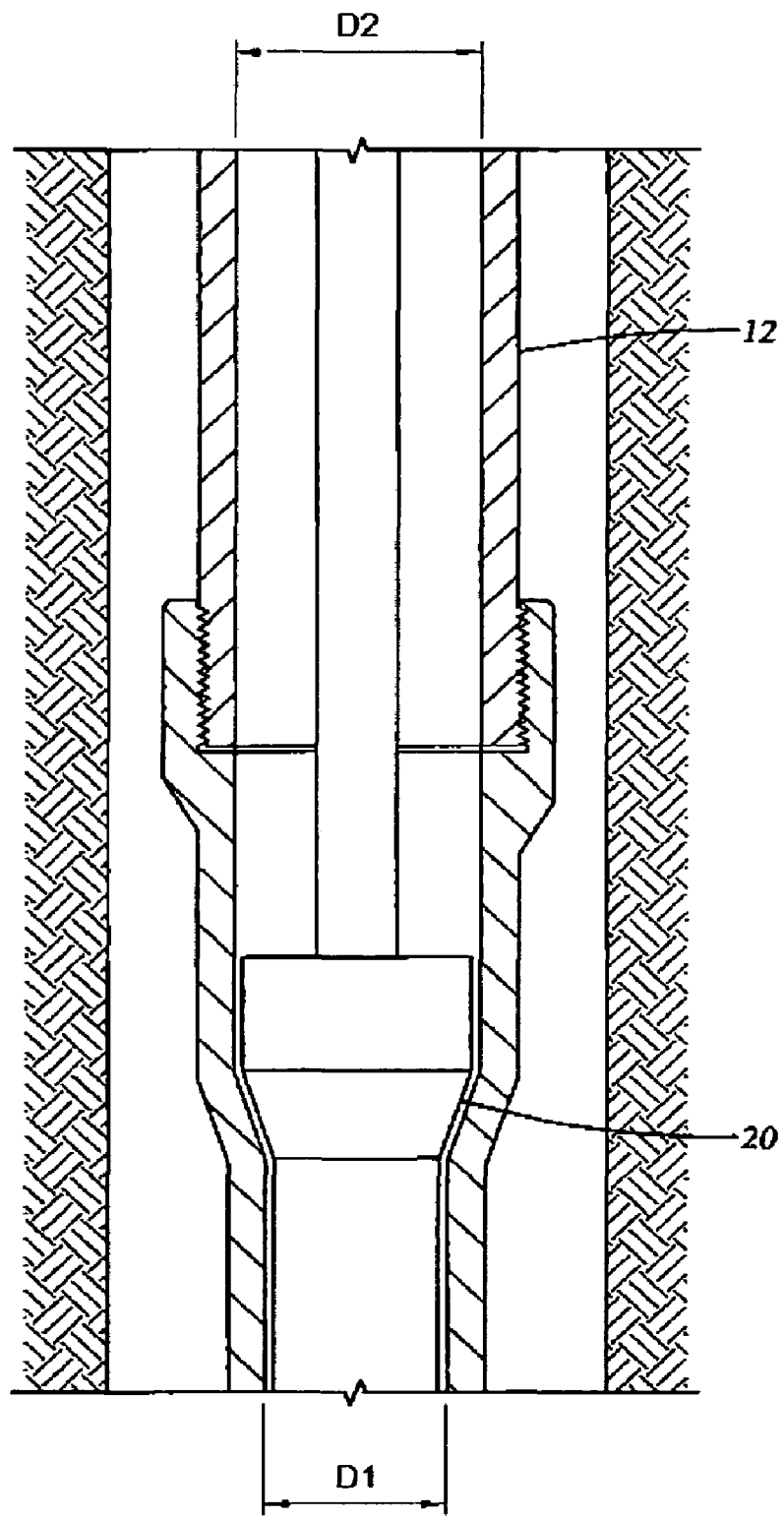

The casing 12 has an outer diameter smaller than the inner diameter of the bore 10, to allow the casing 12 to be run into the bore 10 and subsequently expanded, as illustrated in FIG. 2 of the drawings.

The casing string 12 is formed of a plurality of tubing sections 14, end portions of two of which are shown in the Figure. The tubing sections 14 are provided with end connector portions 16, 18, the upper connector portion being a threaded pin connector 16 and the lower connector portion being a complementary threaded box connector 18.

The form of the connectors 16, 18 is substantially conventional, and the connectors 16, 18 are made up on surface in substantially conventional fashion. However, the connectors 16, 18 are formed of different materials. In particular, the pin 16 is formed of steel having a Young's modulus of elasticity (E) of 29-30×10$^6$ psi (180-210 gPa), whereas the box 18 is formed of titanium alloy, with a modulus of 15-17×10$^6$ psi.

After the casing string 12 has been made up, run into the bore 10, and fixed in place, an expansion device 20 is run through the string 12 and expands the casing from an initial diameter D1 to a larger, expanded diameter D2. In this example, the expansion device is a rotary expander and features a number of rollers which are urged radially outwards into contact with the inner wall of the casing. The rollers produce localised compressive yield of the casing wall, reducing the wall thickness of the casing and producing a corresponding increase in diameter. At the connectors 16, 18, the pin is expanded in this manner, however the box 18 is expanded from contact with the expanding pin 16. Of course, in other embodiments other forms of expander, such as a cone or mandrel, or fluid pressure, may be utilised.

Of course the casing wall passes through yield during the expansion process, but once the expansion device 20 has passed through a casing section the expanded section experience a degree of elastic recovery. At the connector portions 16, 18, the differing materials of the connector portions 16, 18 result in the box 18 experiencing twice the degree of recovery of the pin 16. Of course this creates a significant contact pressure between the pin and box 16, 18, maintaining the mechanical and pressure integrity of the connection.

Figure 3:
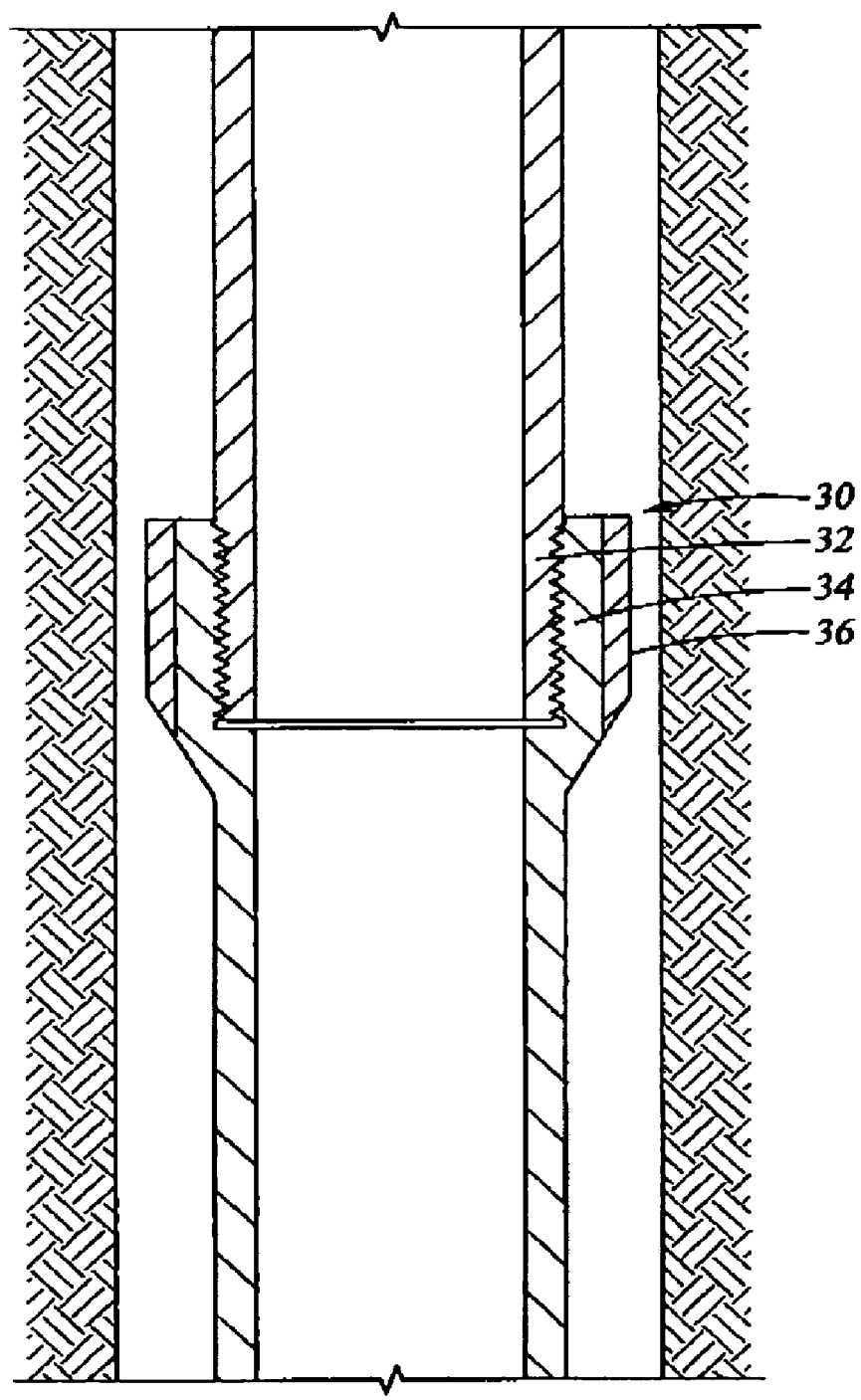
FIGS. 3 and 4 are sectional schematic views of tubing connectors in accordance with further embodiments of the present invention.

Reference is now made to FIG. 3 of the drawings, which illustrates a casing connector 30 in accordance with a further embodiment of the present invention. In this connector 30, the pin and box connector portions 32, 34 are formed of the same materials. However, a titanium alloy band 36 is provided around the box 34.

When the connector 30 is expanded, the greater elastic recovery of the titanium band 36 compresses the box 34 to create a contact pressure between the opposing surfaces of the pin and box 32, 34; in the absence of the band 36, there would be a possibility of the slightly greater degree of elastic recovery of the pin 32 resulting in separation of the pin 32 and box 34, and a loss of mechanical and pressure integrity at the connector 30.

In other embodiments the band 36 may be shorter than the box 34 or may be positioned on the box 34 externally of a seal location, for example an elastomeric seal may be provided within the box and located relative to the ring or band 36 to ensure that the seal is under compression in the expanded connector. Further, the pin 32 may be recessed at the location of the band 36, to facilitate positive interference between the pin and box.

Figure 4:
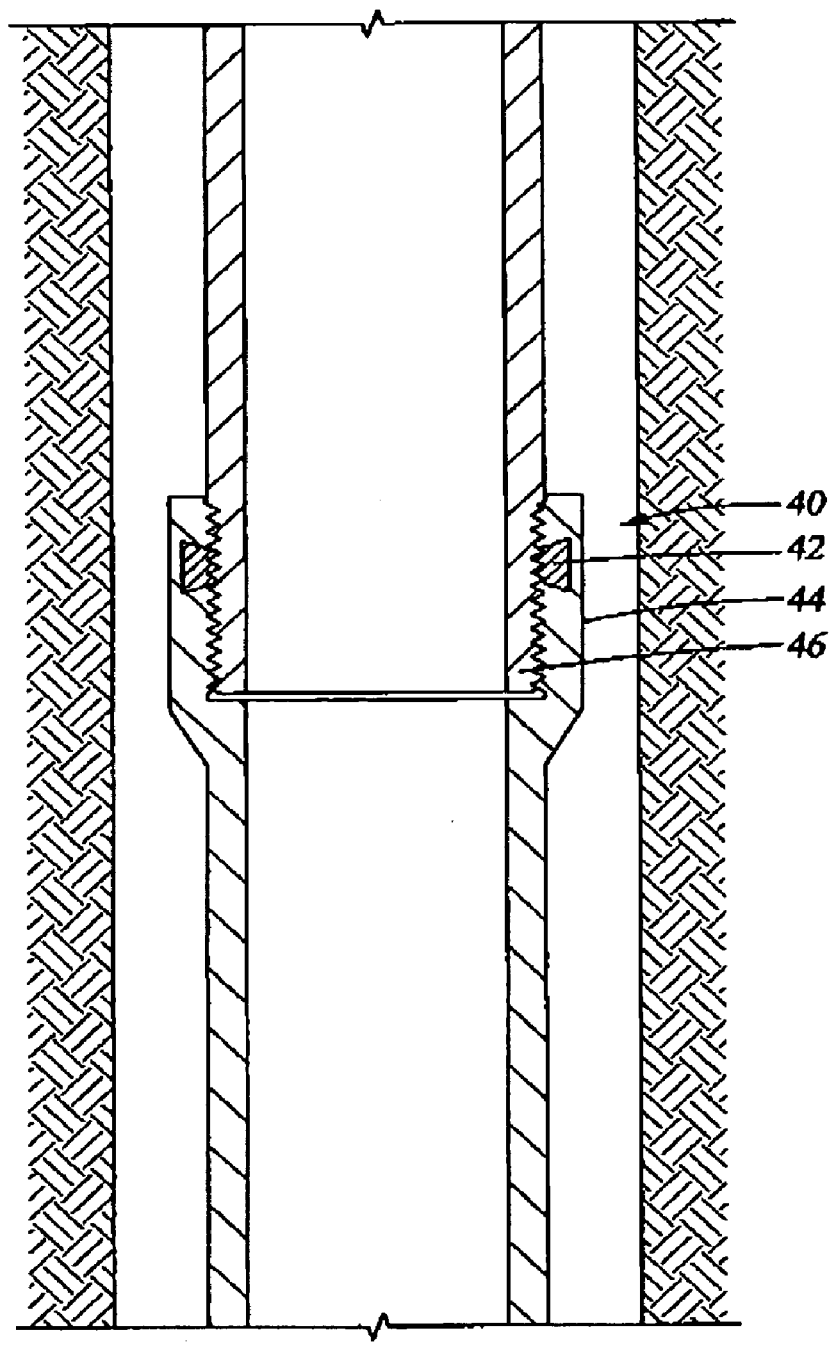

A somewhat similar effect to that provided by the band 36 is achieved in the connector 40 illustrated in FIG. 4 of the drawings, by providing a dovetail section titanium alloy insert 42 in the box connector portion 44, which is otherwise of the same material as the pin connector portion 46. Post expansion, the greater degree of elastic recovery of the insert 42 ensures that the integrity of the expanded connector 40 is maintained.

The insert 42 may be initially fixed in the box 44 or may be floating.

It will be apparent to those of skill in the art that the appropriate selection of material properties of elements of an expandable connector facilitates achieving a secure and reliable coupling between expanded tubulars. In other aspects of the invention material properties other than yield strength and elastic modulus may be determined and selected with a view to ensuring that a secure coupling is achieved.

The invention claimed is:

1. An expandable connector comprising:
   first tubing with an expandable male tubular connector portion having a first yield strength;
   second tubing with an expandable female tubular connector portion adapted to engage with the male tubular connector portion, wherein the female tubular connector portion includes all of the second tubing into which the first tubing is receivable; and
   a band with a second yield strength greater than said first yield strength, wherein the band is terminated flush on end with a longitudinal terminus of the second tubing and is disposed around the female tubular connector portion such that all internally threaded locations of the female tubular connector portion are surrounded by the band.

2. The connector of claim 1, wherein the connector portions are adapted for location downhole.

3. The connector of claim 1, wherein the connector portions are in the form of pin and box connectors.

4. The connector of claim 1, wherein at least one of the connector portions is mounted on a length of liner.

5. The connector of claim 1, wherein at least one of the connector portions is mounted on a length of casing.

6. The connector of claim 1, wherein a fluid seal is provided between the connector portions.

7. The connector of claim 1, wherein said band has a yield strength higher than said female connector portion.

8. The connector of claim 1, wherein a seal member is provided on one of the connector portions internally of said band.

9. The connector of claim 1, wherein the materials utilized to form the connector portions have the same elastic moduli.

10. An expandable connector comprising:
   first tubing with an expandable male tubular connector portion having a first modulus of elasticity; and
   second tubing with a corresponding expandable female tubular connector portion, wherein the female tubular connector portion includes all of the second tubing into which the first tubing is receivable; and
   a band with a second modulus of elasticity less than said first modulus, wherein the band has a constant inner diameter and is disposed around the female tubular connector portion such that all internally threaded locations of the female tubular connector portion are surrounded by the band.

11. The connector of claim 10, wherein the connector portions are adapted for location downhole.

12. The connector of claim 10, wherein the connector portions are in the form of pin and box connectors.

13. The connector of claim 10, wherein at least one of the connector portions is mounted on a length of liner.

14. The connector of claim 10, wherein at least one of the connector portions is mounted on a length of casing.

15. The connector of claim 10, wherein a fluid seal is provided between the connector portions.

16. The connector of claim 10, wherein said band has an elastic modulus lower than said female tubular connector portion.

17. The connector of claim 10, wherein a seal member is provided internally of said band.

18. The connector of claim 10, wherein the materials utilized to form the connector portions have similar yield strength.

19. An expandable connector, comprising:
   first tubing with an expandable male tubular connector portion having a first yield strength;
   second tubing with an expandable female tubular connector portion adapted to engage with the male tubular connector portion, the female tubular connector portion including all of the second tubing into which the first tubing is receivable, wherein the portions have initial and expanded states with respective inner diameters in the initial state that are smaller than in the expanded state; and
   a band disposed around the female tubular connector portion such that all internally threaded locations of the female tubular connector portion are surrounded by the band, wherein the band has a second yield strength greater than said first yield strength and compresses the female tubular connector portion in the expanded state such that pressure contact exists between opposing surfaces of the portions in the expanded state.

* * * * *